May 6, 1930. J. D. SARTAKOFF 1,757,061
LIQUID LEVEL INDICATING SYSTEM
Filed March 15, 1926 3 Sheets-Sheet 2
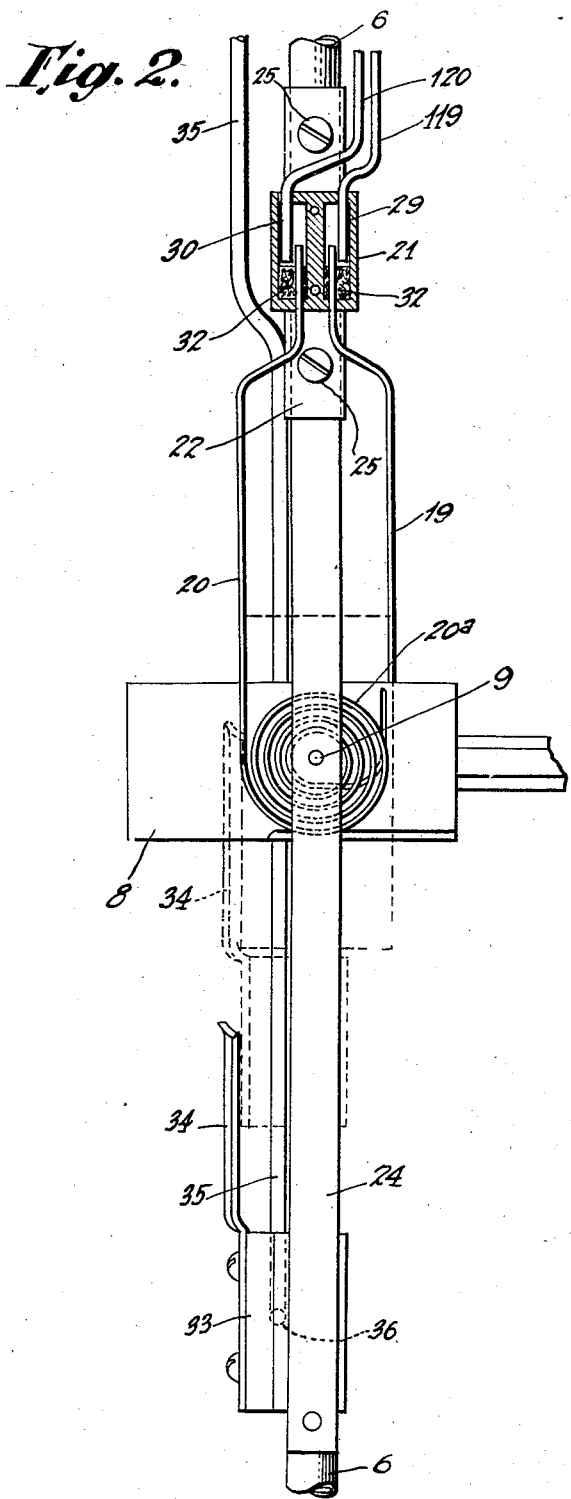
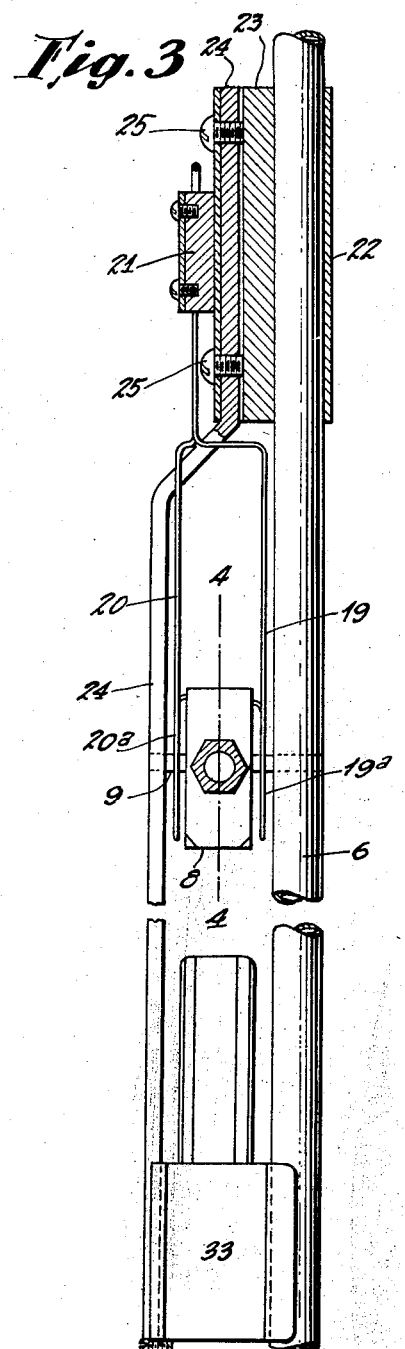
INVENTOR.
Jack D. Sartakoff
BY Jas. H. Griffin
ATTORNEYS.

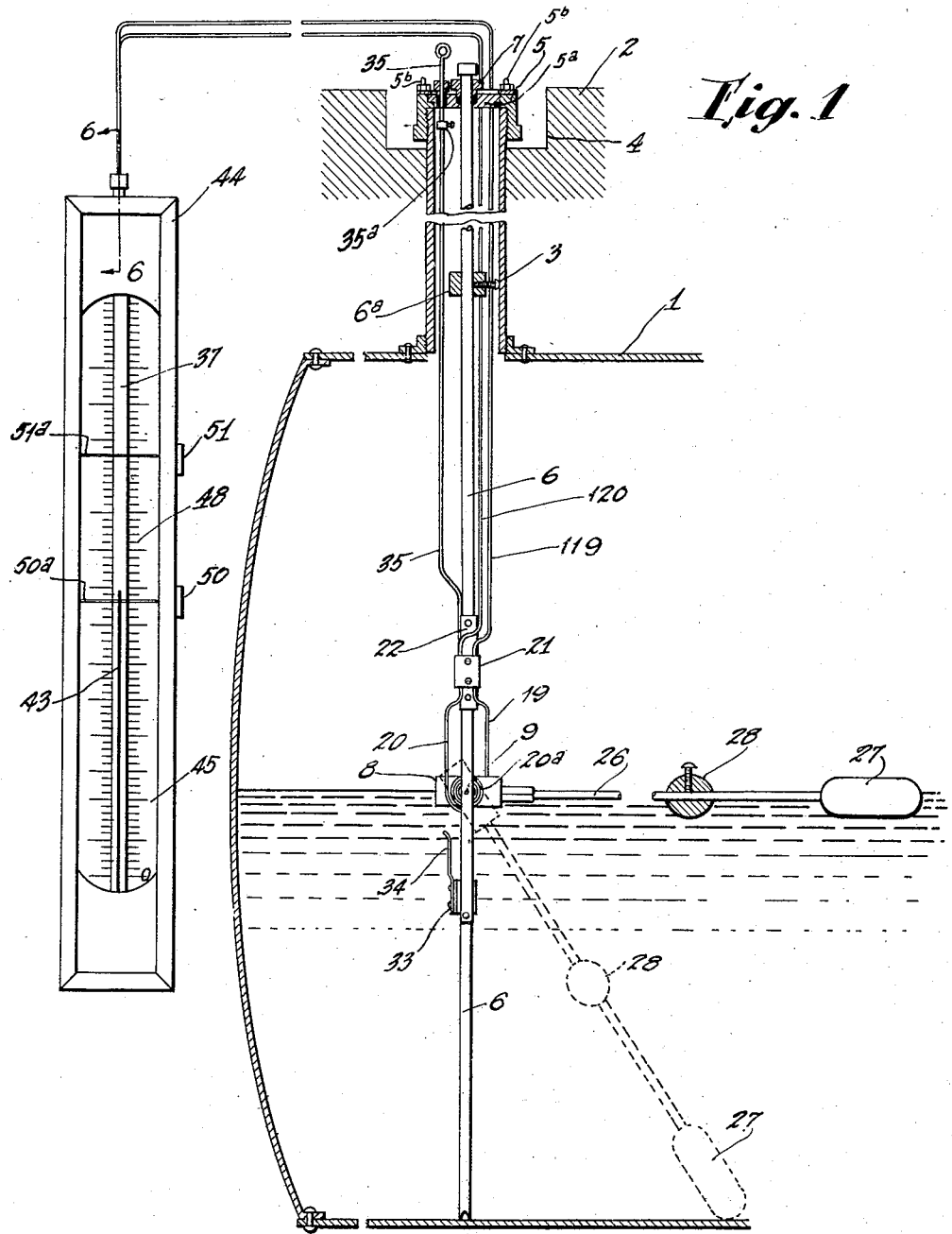

May 6, 1930.                 J. D. SARTAKOFF                 1,757,061
                       LIQUID LEVEL INDICATING SYSTEM
                  Filed March 15, 1926        3 Sheets-Sheet 3
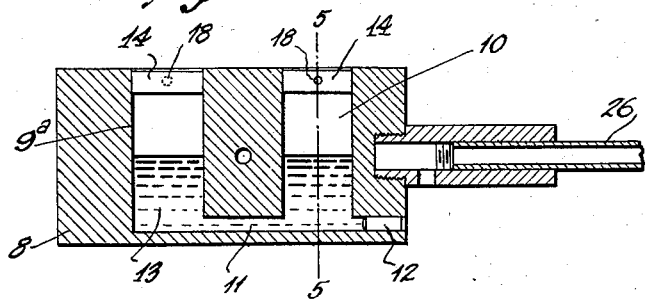
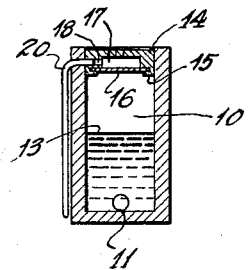
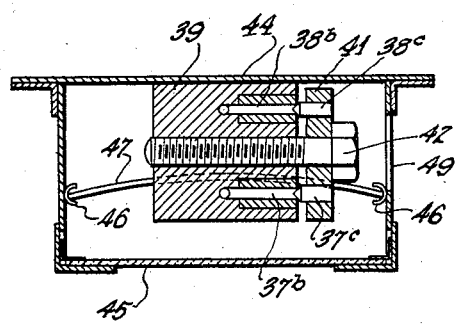
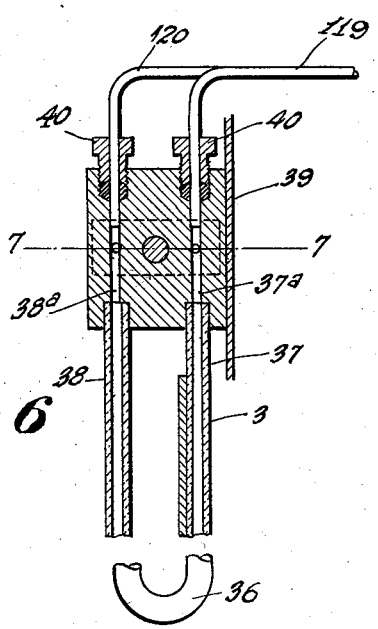
INVENTOR.
Jack D. Sartakoff
BY Jas. L. Griffin
ATTORNEYS.

Patented May 6, 1930

1,757,061

UNITED STATES PATENT OFFICE

JACK D. SARTAKOFF, OF NEW YORK, N. Y., ASSIGNOR OF ONE-HALF TO J. D. SARTAKOFF CORPORATION, OF NEW YORK, N. Y., A CORPORATION OF NEW YORK, AND ONE-HALF TO KHETAH CORPORATION, OF NEW YORK, N. Y., A CORPORATION OF NEW YORK

LIQUID-LEVEL-INDICATING SYSTEM

Application filed March 15, 1926. Serial No. 94,650.

This invention is a liquid level indicating system adapted for the automatic indication of liquid levels at remote points from the containers of the liquid, and is particularly adapted to be used for indicating the liquid level or quantity of gasoline contained within underground supply tanks in garages, filling stations and the like. I am aware, however, that the invention is adapted for general application and is not limited to this specific use.

The object of the invention, broadly stated, is to provide a simple, yet thoroughly efficient and accurate system for the indication of liquid levels and one wherein atmospheric changes, such as variations in temperature, will not effect errors in indication.

Under prior practice, the most common method of accurately measuring the contents of underground tanks consists in the employment of a measuring stick which is thrust down through a measuring pipe to the base of the tank. This is a fairly accurate method of measuring, but is inconvenient and as a result is not carried out as frequently as circumstances may warrant, so that, in many instances, tanks become empty without knowledge of this approaching condition until feed of liquid from the tank ceases.

Numerous expedients have been resorted to in an attempt to replace, by more convenient means, the practice of using a measuring stick, but, for one reason or another, such expedients have not proven satisfactory. In the majority of cases, they are either too complex and difficult to install or they are not reliable. As a general proposition, all those measuring systems, adapted to be associated with underground tanks and employing an above ground indicator, require extensive and expensive alterations in the tank installation.

In practically all cases, it is necessary to dig down to the tank and cut away a portion of the tank to permit the introduction of suitable float mechanism for operating the indicating element. This is an expensive procedure and unless incorporated in tanks at the time of installation of such tanks, it is not ordinarily feasible to add such indicating system to an installation.

With the foregoing considerations, and others well recognized in the art, in mind, the present invention embodies numerous objects and features all directed to the provision of a simple and efficient system capable of incorporation into an old tank installation without requiring any excavation or in anywise changing the installation. This is a matter of first importance from a practical standpoint.

In tank installations, it is the practice to bury the tank several feet below the surface of the ground and to provide a measuring pipe leading from the ground surface to the tank and through which a measuring stick may be introduced into the tank. In practically carrying out the present invention, that portion of the system which is adapted to be positioned within the tank is so constituted and proportioned with respect to the said pipe that for installation of the device, it is only necessary to lower such portion of the system through said pipe into the tank, a cap being provided for thereafter sealing the upper end of the pipe.

That portion of the device adapted to be positioned in the tank consists of a float which is affixed to a cylinder provided therein with a mobile piston. The cylinder is, in practice, preferably U-shaped and is formed in a cylinder block mounted to tilt on a horizontal axis under the impulse of the float for the purpose of shifting the mobile piston longitudinally of the cylinder. The two opposite ends of the cylinder chamber are connected by conduits which lead upwardly through the filling pipe and through the cap thereof, and thence are led to a U tube positioned in any suitable location, where it is desired to indicate the liquid level in the tank. One of the conduits leads from one end of the cylinder to one arm of the U tube and the other conduit leads from the other end of the cylinder to the other arm of the U tube.

The U tube contains a liquid reading column, the position of which is varied in the U tube by varying pressures produced in the arms of the tube above the column due to tilting of the cylinder on its pivot under the impulse of the float. Thus, the position of the float controls the positions of the reading column.

In order that variations in temperature will not affect the correct indication of the liquid level, both conduits, to which I have referred, are preferably valved so that when desired they may be simultaneously vented to permit the communication of atmospheric air into both of them, in order that a balanced condition may be effected therein, when the float is at its minimum level, so that the reading column may be adjusted to zero position.

It is essential that during the venting of the conduits to balance the pressures as stated, the float must be in a predetermined position if accurate indication of liquid levels in the tank is to be obtained, and I therefore provide means operable from above the ground to manually place the float in proper position during this venting operation.

The provision of means for venting the system and for properly positioning the float during this operation is of pronounced practical importance and absolutely novel in this art. It constitutes a marked step in advance of prior practice, since by this feature absolutely accurate indication of the liquid level in the tank can be had. Furthermore, this can be obtained in an apparatus capable of association with an underground tank without necessitating excavation or any changes in the tank.

What has been said applies both to tanks wherein liquid is adapted to be pumped therefrom and to systems wherein the liquid is forced therefrom under hydraulic pressure.

Another feature of the present invention consists in supporting the mechanism, adapted to be positioned within the tank, upon a tubular post or standard adapted to extend, when the installation is complete, from a point above the ground to the base of the tank. This supporting post serves as a mounting for all of the apparatus to be positioned within the tank and provides a convenient means of introducing and supporting the apparatus therein. Moreover, inasmuch as the supporting post is hollow, it affords convenient means for relieving gasoline tanks of water, which commonly accumulates in the base of such tanks and must be pumped off from time to time. It has heretofore been the practice to introduce a tube into the tank for this purpose, but in accordance with the present invention, this is rendered unnecessary by the use of a hollow supporting post.

Numerous other features and advantages will be apparent from the hereinafter detailed description and claims and from the accompanying drawings.

The accompanying drawings illustrate one practical embodiment of the invention, but the construction therein shown is to be understood as illustrative only, and not as defining the limits of the invention.

Figure 1 shows, in a more or less diagrammatic manner, the present invention as installed in an underground tank, the tank being shown in section.

Figure 2 is an enlarged elevation of the portion of the apparatus shown within the tank in Figure 1.

Figure 3 is an edge elevation of the mechanism shown in Figure 2 as viewed from the right hand side of Figure 2.

Figure 4 is a fragmental section taken in the plane of the line 4—4 of Figure 3.

Figure 5 is a section on the line 5—5 of Figure 4.

Figure 6 is a fragmental section taken in the plane of the line 6—6 of Figure 1; and, Figure 7 is a section taken in the plane of the line 7—7 of Figure 6.

Referring to the drawings, 1 indicates a tank which is shown as buried below the ground level 2. A pipe 3 extends from within a recess 4 within the ground surface downwardly to and is secured to the tank. This pipe is found on all installations and is generally provided for the insertion of a measuring stick.

In associating the present invention with such an installation, a cap 5 is provided for the pipe 3. The center of this cap is cut away and a stepped plate $5^a$ is fitted into the hole and held in place by screws $5^b$. This plate has a central hole in which is introduced a tubular supporting post 6 and a gland 7 is associated with the hole to preclude leakage at this point. The post 6 is sufficiently long to rest upon the bottom of the tank as shown in Figure 1, when the cap is screwed onto the pipe 3 and on the post 6 is mounted the operating mechanism of the system.

This operating mechanism, which is best shown in Figures 2 to 5, embodies a cylinder block 8 mounted to tilt on a horizontal pivot 9. The cylinder block may be of any suitable construction, but, in practice, I preferably make it of substantially rectangular form. In the block 8 are formed two vertical passages $9^a$ and 10, which are connected by a longitudinal passage 11, the end of which is plugged as shown at 12 (see Figure 4). The passages $9^a$, 10 and 11 collectively constitute a substantially U shaped cylinder adapted to contain a mobile piston 13, which, in practice, is preferably mercury, though it may be of any other suitable heavy liquid. The mercury is introduced while the passages 9 and 10 are open and said passages are thereafter closed by inserting plugs 14.

As shown in Figure 5, the plugs are of inverted cup shape and at the lower edge of each is formed a thin flange 15 bent inwardly as shown in Figure 5 to clamp in place a suitable filtering diaphragm 16 adapted to permit of the passage of air while effectually precluding the passage of mercury. This arrangement provides within each plug a chamber 17 partitioned off from the cylinder chamber by a diaphragm 16.

As shown in Figures 4 and 5, the wall of the block 8 and the skirt of each plug 14 is pierced at 18 to provide for the insertion of the free end of a relatively small tube, whereby the interior of the chamber 17 may be placed in communication with the interior of the corresponding tube. Thus the chamber 17 of the passage 9ª is connected by means of a tube 19, while the tube 20 similarly leads from the chamber associated with the passage 10. These two tubes lead to a condenser or sump 21, which is mounted upon a clamp 22. The clamp 22 is in the form of a sleeve which surrounds the post 6 and also embraces a clamping jaw 23 and the upper end of a bracket 24. The bracket 24, as shown in Figures 2 and 3, extends downwardly from the sleeve 22 and is off set to provide sufficient space between the off set portion of the bracket and the post 6 to permit the cylinder block to be positioned in such space.

The pivot 9 which supports the block for tilting movement is journalled at one end in the bracket 24 and at its other end in the post 6. Screws 25 extend loosely through the sleeve 22, thread through the bracket 24 and bear against the jaw 23, so that by tightening these screws, the bracket may be tightly clamped to the post. If desired, the parts may be so formed, as by providing a lug on the bracket, that both ends of the pivot 9 will be supported on the bracket, or the jaw 23 may be extended downwardly to support one end of the pivot 9, in order that the pivot may be mounted for vertical adjustment on the post 6. This, however, is a matter of detail.

In order that the conduits or tubes 19 and 20 may not interfere with tilting movement of the cylinder block 8, each tube is preferably formed into a plurality of spiral convolutions 19ª and 20ª which encircle the pivot 9 on the opposite sides of the cylinder block, as shown best in Figures 2 and 3.

Secured to one end of the cylinder block, preferably in a rigid manner, is a rod 26 which carries a float 27 at its outer end and it is the rise and fall of the float with the rise and fall of liquid level in the tank which imparts the tilting movement to the cylinder block. On the rod 26 is fixed an adjustable weight 28, the purpose of which will be hereinafter more fully explained.

I have stated that the tubes 19 and 20 lead to a condenser or sump 21. This sump is shown in Figure 2 with the cover plate removed and from this figure, it will be noted that the sump embodies two chambers 29 and 30. The tube 19 extends through the bottom of the chamber 29 to above the center thereof and the tube 20 similarly projects into the chamber 30. From the chambers 29 and 30 extend conduits 119 and 120. These conduits, as shown in Figure 2, extend from a point below the upper ends of the tubes 19 and 20 upwardly through the upper walls of the respective chambers and upwardly along the post 6 through the cap 5 being provided where they pass through the cap, with suitable glands to preclude leakage of pressure or suction at this point. Beyond the cap 5 the conduits lead to indicating means hereinafter more fully explained.

The purpose of the sump 21 is to trap out any condensation or moisture which may accumulate in the conduits 119 and 120 and the base of each chamber of the sump is preferably provided with a suitable absorbing medium 32 to absorb this moisture, so that it will not pass downwardly to the cylinder block.

In practice, the parts thus far described are so shaped and proportioned that they may be introduced into or removed from the tank through the pipe 3. Inasmuch as the float rod 26 will normally extend in a lateral direction, it is desirable to provide means for moving said rod into substantially parallel relation with the post 6 when it is desired to introduce or remove the operating mechanism described. In order to accomplish this result in a thoroughly efficient and expeditious manner, I mount a cross head 33 for sliding movement, said cross head being guided between the post 6 and the parallel lower portion of the bracket 24 and secured to the cross head is an upstanding finger 34.

Extending downwardly through the cap 5 is a rod 35, the lower end of which is secured to the cross head at 36, so that the cross head may be reciprocated from the ground level by lifting or depressing the rod 35. The finger 34 is so shaped that when the rod 35 is lifted to lift the cross head, the upper end of the finger will engage with the cylinder block on the opposite side of the pivot 9 from the float and continued elevation of the cross head will tilt the cylinder block into substantially vertical position as shown in dotted lines in Figure 2. A stop 35ª is mounted on the rod 35 to limit the upward movement thereof so that the parts cannot be strained by exertion of too great a pull on said rod.

The float rod 26 and the float will thus be moved into alinement with the remainder of the operating means, so that the complete operating means may be removed by merely unscrewing the screws 5ᵇ to release the plate 5ª and lifting out the entire apparatus through the pipe 3. When inserting the controlling apparatus, the procedure is of course the same except that when the plate 5ª is screwed down tight, and the rod 35 is forced downwardly to release the cylinder block to permit of operation thereof by the float. A guide 6ª fixed on the post 6 has radially extending arms to centralize the post within the pipe 3 during removal or replacement of the apparatus.

It will therefore be apparent that the operating means of this invention may be readily and expeditiously associated with any tank installation without any change whatsoever in the installation.

The mechanism which I have thus far described serves as the operating means for indicating adjuncts adapted to be positioned at a distance from the tank such, for example, as in the office of a garage or service station. The indicating means may partake of various forms without departing from the invention, but, a very satisfactory form, is shown in the drawings, wherein 36 designates a U tube provided with two upstanding arms 37 and 38, the upper ends of both of which are secured to a valve casing 39. The valve casing is formed with two straight through passages 37$^a$ and 38$^a$ to the former of which the conduit 119 leads, and to the latter of which the conduit 120 leads, as shown best in Figure 6.

Stuffing boxes 40 operate to preclude leakage where the conduits enter the valve casing. From the passages 37$^a$ and 38$^a$, lateral vent passages 37$^b$ and 38$^b$ extend to the lateral face of the casing (see Figure 7) and a pair of needle valves 37$^c$ and 38$^c$ simultaneously cooperate with both of these vent passages. Both needle valves are supported in a common holder 41 controlled by an operating screw 42. When the screw 42 is tightened, both of the needle valves are drawn to the left in Figure 7 to simultaneously tightly seal both vent passages, but when the screw is loosened, both needle valves are withdrawn from the vent passages for the purpose of venting the system in order that balanced atmospheric pressures may be produced in both arms of the U tube, as well as in the conduits 119 and 120 and the tubes 19 and 20. This will of course produce a similar condition within the chambers at both ends of the mobile piston in the cylinder block. The importance of the ability to thus vent the system will be hereinafter more fully explained.

The U tube 36 contains a suitable liquid constituting a reading column 43 and it is found in practice that when the needle valves shown in Figure 7 are seated tightly to close the system, the position of the reading column will be determined by the position of the float 27. The reason for this will be clearly apparent when it is borne in mind that the raising or lowering of the float will impart movement to the mobile piston within the cylinder to produce increased pressure at one end of the cylinder and a corresponding decrease in pressure at the other end of the cylinder. These variations in pressure will be communicated through the conduits to the U tube and will produce like conditions within the respective arms of such tube. These different pressures will manifestly cause a shifting of the reading column in strict accordance with the movements of the float.

In practice, the U tube is mounted within a suitable casing 44, in which the tube is positioned in upstanding relation and occupies a plane substantially perpendicular to the front of the casing which is formed by a glass panel 45. The sides of the casing are preferably provided on their inner faces with vertical guides 46 with which cooperate the lateral edges of a strip of suitable material 47 on which is delineated a graduated scale 48. The scale card 47 is positioned back of the arm 37 of the U tube and forwardly of the arm 38, so that the graduations are positioned immediately back of that arm of the U tube which contains that portion of the reading column serving as an indication.

By mounting the scale card 47 in the manner described, it may be shifted vertically in guides 46 for the purpose of adjusting the scale with reference to the reading column. One side of the casing is provided with an opening 49 (see Figure 7) through which a socket wrench may be inserted to engage with the head of the screw 42, in order that the needle valves may be manipulated without necessitating the opening of the casing.

Mounted for vertical sliding movement in the casing in any suitable manner are a pair of slides 50 and 51, the former of which carries a wire 50$^a$ and the latter of which carries a wire 51$^a$. Both these wires extend across the casing forwardly of the arm 37 of the U tube and may be manually adjusted vertically to enable comparative readings to be made, as will be hereinafter more fully explained.

In practice, the operating mechanism of the system is introduced into the tank through the pipe 3 and the cap 5 positioned thereon in the manner hereinbefore described. Thereafter the casing 44 with the U tube and other parts of the structure carried thereby is mounted in any suitable location, and these two major elements of the system are connected together by the conduits 119 and 120. The system is now completely installed and proper adjustment of the parts is undertaken. This is accomplished by lifting the rod 35 to elevate the follower and force the cylinder 8 into a position which corresponds to the minimum liquid level in the tank 1, as indicated in the dotted line position of the float and rod in Figure 1. With the cylinder in this position, the needle valves 37$^c$ and 38$^c$ are unseated to vent the system and as a result of this venting the measuring liquid 43 in the U tube comes into a position wherein the liquid column will raise to the same level in both arms of the U tube. The scale card 47 is now vertically adjusted in the guides 46 until the graduation on the scale card showing a condition wherein the tank is empty is positioned at the upper end of the reading column in the arm 37 of the U tube.

The needle valves 37° and 38° are now seated, the rod 35 is depressed into the full line position of Figure 1, and the apparatus is thereupon ready to properly function. The float will immediately rise to the liquid level in the tank 1 and its position will be accurately indicated by the reading column when read in conjunction with the scale card. Thereafter rise or fall of the liquid level in the tank 1 will be accurately indicated by the reading column, but at suitable intervals the system may be vented to obviate any inaccuracies in reading which might result from the presence of improper unbalanced pressures in the conduits.

It will be of course understood in this connection that whenever the system is vented, the cylinder should be forced into a position corresponding to minimum liquid level in the tank 1 in order that correct relative adjustment between the parts of the system may be had.

In practice, the ability to check the system from time to time without removing any of the parts of the system and without unsealing the tank 1 is of marked practical importance, as will be apparent to those skilled in the art. The building up of false pressures which would result in false readings without proper means for obviating this, is, by the present invention, entirely overcome.

I have referred to the wires 50ª and 51ª. These are associated with the scale card in order that comparative readings may be had when desired, as, for example, when it is desired to ascertain the amount of liquid introduced into or drawn from the tank 1 during any particular period or operation. These wires are readily adjustable vertically of the scale card and may be manually manipulated at the will of the operator.

In the foregoing detailed description, I have set forth the invention when utilized in a system wherein liquid is pumped from the tank 1 by a suction pump. In such systems, it is not uncommon for water to accumulate in the bottom of the tank when the tank is adapted to contain gasoline. It is essential from time to time to remove this water, but in accordance with the present invention, this can be readily done by merely removing the cap from the top of the hollow post 6, attaching a pump at this point and pumping off the water which has accumulated in the tank through said post.

The present invention while particularly adapted for suction systems is not, however, restricted to use in this connection as it may be utilized to advantage in pressure tanks as well. In the so-called pressure feed of gasoline, it is the practice to admit water under pressure (generally pressure of the city main) into the tank for the purpose of forcing the gasoline out of the tank. In such systems, the water and gasoline stratify, the latter remaining in the upper portion of the tank and the former in the lower portion thereof. There is a clear line of demarcation between the gasoline and water under these conditions and it is for the purpose of permitting the float to properly operate under these conditions that the weight 28 is shown as associated with the float rod.

When used in a hydraulic system of the character described, the weight is adjusted at such position on the rod that the float will be buoyant in water, but not buoyant in gasoline. Accordingly, when the parts are properly adjusted, the float will partake of a position at the line of demarcation between the gasoline and the water and will rise and fall with the water level. It will of course be understood that the less gasoline in the tank, the higher will be the water level and consequently when used in this connection, the conduits 119 and 120 should be reversed with respect to the U tube, so that the conduit 119 would be secured to the leg 38 of the U tube and the conduit 120 secured to the leg 37. This change having been made, the system, as shown, will operate as well in a hydralic feed system as in a pump feed system and will function in substantially the same manner. It may be desirable, however, when thus employing the invention in a hydraulic system to position the finger 34 on the opposite side of the cross head 33, so that when the rod 35 is elevated, it would force the float upwardly toward the top of the tank and in a position corresponding to minimum gasoline supply instead of forcing it downwardly as shown in the drawings. This slight change, however, will be apparent to those skilled in the art and it has not been considered necessary to specifically illustrate it in the drawings.

The device in practice is extremely simple, but in operation is very sensitive to the changes in position of the float. This is, in a great measure, due to the fact that the float has little if any actual work to do. The only resistance offered to the float is the negligible friction of the bearings of the pivot. This is in pronounced contradistinction to indicating systems of the prior art wherein the float is required to move a series of diaphragms, long columns of liquid, various levers, gears and dial pointers. The invention has been particularly described, for the purpose of illustration, as used in conjunction with gasoline supply tanks, but it may be employed to accurately indicate the contents of any tank. A slight variation of specific gravity of the liquid in the tank has absolutely no effect on the accuracy of the readings in the system of this invention because this system measures liquid levels and not pressures.

In practice, the conduits 119 and 120 preferably extend from the ground level to the casing of the U tube through a common conduit, generally BX cable whereby both conduits are subjected to like variations in temperature and therefore expansion or contraction of the air in said conduits has no effect upon the readings. It will be noted, moreover, that the apparatus embodies, in its normal operation, only one movable part having pivotal connection and consequently wear is negligible.

The foregoing detailed description deals with the invention in its preferred practical form, but the invention is to be understood as fully commensurate with the appended claims.

Having thus fully described the invention, what I claim as new and desire to secure by Letters Patent is:

1. In a liquid level indicating system, an indicating element operable by differential pressures, in combination with a controlling element embodying a cylinder block having a cylinder therein and mounted to oscillate on a substantially horizontal axis and shaped so that the opposite ends of the cylinder extend upwardly above the intermediate portion of the cylinder, a body of liquid within the cylinder and forming a liquid seal intermediate the ends of the cylinder to divide the interior of the cylinder into separate chambers positioned above the surface of the liquid and sealed with respect to one another by said body of liquid, the pivot axis being so located relative to the cylinder that, when the cylinder block is oscillated, the volumes of said chambers are varied inversely with respect to one another, a conduit leading from each of said chambers to the indicating element for communicating operating differential pressures thereto, a float connected to the cylinder block to oscillate the same in accordance with the rise and fall of level of the body of liquid to be measured, means for oscillating the cylinder block into a predetermined position, and means for venting both conduits while the cylinder block is in said predetermined position to free the indicating element of the differential pressures resulting from the placing of the cylinder block in said predetermined position.

2. In a liquid level indicating system, a U tube containing a liquid reading column, and a reading scale associated therewith, in combination with a controlling element embodying a cylinder block having a cylinder therein and mounted to oscillate on a substantially horizontal axis and shaped so that the opposite ends of the cylinder extend upwardly above the intermediate portion of the cylinder, a body of liquid within the cylinder and forming a liquid seal intermediate the ends of the cylinder to divide the interior of the cylinder into separate chambers positioned above the surface of the liquid and sealed with respect to one another by said body of liquid, the pivot axis being so located relative to the cylinder that when the cylinder block is oscillated, the volumes of said chambers are varied inversely with respect to one another, a conduit leading from one chamber of the cylinder to one arm of the U tube, another conduit leading from the other chamber of the cylinder to the other arm of the U tube, a float connected to the cylinder block to oscillate the same in accordance with the rise and fall of level of the body of liquid to be measured, means for venting both conduits to permit the liquid reading column in the U tube to assume a position wherein both of its opposite ends are at the same level, irrespective of the position of the cylinder block, and means for moving the float to its lowest operative position, and maintaining it there while said conduits are vented.

3. In a liquid level indicating system, a U tube containing a liquid reading column and a reading scale associated therewith, said column tending to normally gravitate into a quiescent state with the opposite ends of the column at the same zero level, in combination with a controlling element operable by the level of the liquid to be measured for generating differential pressures, conduits leading from the controlling element to the arms of the U tube to communicate differential pressures to the opposite ends of the liquid reading column therein, means for venting said conduits to permit the liquid reading column to assume zero position irrespective of the level of the liquid to be measured, and means for placing the controlling element in a condition corresponding to a predetermined minimum liquid level of the liquid to be measured and for maintaining the controlling element in this condition while the conduits are vented.

4. An assembly of the character described comprising a tank, a pipe leading to the tank, a liquid level indicating element positioned exteriorly of the tank and operable by differential pressures, a supporting member extending through the pipe into the tank, a cylinder block having a cylinder therein and pivotally mounted on the supporting member to oscillate on a substantially horizontal axis and shaped so that the opposite ends of the cylinder extend upwardly above the intermediate portion of the cylinder, a liquid piston within the cylinder and forming a liquid seal intermediate the ends of the cylinder to divide the interior of the cylinder into two separate chambers positioned above the surface of the liquid and sealed with respect to one another by said body of liquid, a float connected to the cylinder block to oscillate said cylinder block as the liquid level in the tank rises and falls, conduits connecting the chambers of the cylinder to the indicating element for communicating differential pressures from the cylinder to said element, said float and cylinder block being shaped and proportioned to be passed through the pipe leading to the tank when the parts are in predetermined relative positions, and means, operable from the exterior of the tank to place said parts in such relation.

5. An assembly of the character described comprising a tank, and a pipe leading into the top of the tank in combination with a hollow supporting post extending downwardly through said pipe and resting on the bottom of the tank and through which post liquid in the tank may be pumped out, a pressure operated indicating element positioned exteriorly of the tank, float controlled pressure producing means supported on the hollow post interiorly of the tank and shaped and proportioned to be introduced into and removed from the tank through said pipe, and means extending through the pipe for connecting the pressure producing means to the indicating element.

6. In a liquid level indicating system, an underground tank, a pipe leading from the surface of the ground down to the tank and secured to the wall thereof, a tubular post extending downwardly through the pipe to substantially the bottom of the tank and through which post liquid can be removed from the tank, and liquid level indicating means, a portion of which is positioned within the tank and is supported on and carried by the tubular post.

In testimony whereof I have signed the foregoing specification.

JACK D. SARTAKOFF.